US007099961B2

(12) United States Patent
Sethi et al.

(10) Patent No.: US 7,099,961 B2

(45) **Date of Patent: *Aug. 29, 2006**

(54) SYSTEM INCLUDING REAL-TIME DATA COMMUNICATION FEATURES

(75) Inventors: Prashant Sethi, Folsom, CA (US); Carl L. First, Gilroy, CA (US); Krishnan Rajamani, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/036,895

(22) Filed: Jan. 14, 2005

(65) Prior Publication Data

US 2005/0182865 A1 Aug. 18, 2005

Related U.S. Application Data

(63) Continuation of application No. 10/145,244, filed on May 13, 2002, now Pat. No. 6,865,622.

(51) Int. Cl.
*G06F 13/28* (2006.01)

(52) U.S. Cl. ........................................................ 710/22

(58) Field of Classification Search .................. 710/22
See application file for complete search history.

(56) References Cited

U.S. PATENT DOCUMENTS 5,020,020 A 5/1991 Pomfret et al.
5,434,976 A 7/1995 Tan et al.
5,909,564 A 6/1999 Alexander et al.
6,212,195 B1 4/2001 McCormack et al.
6,360,286 B1 3/2002 Houg
6,373,841 B1 4/2002 Goh et al.
6,404,861 B1 6/2002 Cohen et al.
6,529,945 B1 3/2003 Calhoun et al.
6,564,267 B1 5/2003 Lindsay
6,651,107 B1 11/2003 Conley et al.
6,681,254 B1 1/2004 Gregg et al.
2002/0161941 A1* 10/2002 Chue et al. .................. 710/22

FOREIGN PATENT DOCUMENTS

JP 2001-268136 9/2001

* cited by examiner

*Primary Examiner*—Lynne H. Browne
*Assistant Examiner*—Tse Chen
(74) *Attorney, Agent, or Firm*—Schwegman, Lundberg, Woessner & Kluth, P.A.

(57) ABSTRACT

In an embodiment of the invention, a system includes a direct memory access (DMA) engine to move data on a real time basis and a communication front-end to transmit and receive the data. In another embodiment, the system may also include a medium access control (MAC) to control transmission and reception of the data and that may be partitioned or divided according to response times to carry out selected functions. Other embodiments of the invention are described and claimed.

23 Claims, 4 Drawing Sheets

SYSTEM INCLUDING REAL-TIME DATA COMMUNICATION FEATURES

This application is a continuation of U.S. patent application Ser. No. 10/145,244, filed on May 13, 2002, now U.S. Pat. No. 6,865,622, both of which are incorporated herein by reference.

FIELD

The embodiments of the present invention relate generally to computer systems, communication systems and the like, and more particularly to a system including real-time data transmission and reception features.

BACKGROUND INFORMATION

Communication/computer systems and devices typically include communication front-ends that require real-time input or output of data for transmission and reception of the data on a communication medium. In such systems or devices, a communication processor including an associated memory or storage device runs a real-time operating system to supply and receive the data from the communication front-end isochronously without under-runs or over-runs.

A computer system or device running an operating system without real-time capabilities, such as the Microsoft Windows® family of operating systems or the like, requires a dedicated communication co-processor to supply and receive data on a real-time basis from a communication front-end. For data transmission, the real-time software running on the communication co-processor receives the data from the host computer system and buffers the data into an associated local storage or memory device. The co-processor then monitors the communication front-end and supplies the data to the communication front-end in a time-bounded manner when the communication front-end is able to transmit the data. For data reception, the real-time software on the co-processor receives the data in a time-bounded manner from the communication front-end and buffers the data in the associated local storage until the host computer is ready to receive the data. The additional co-processor and associated local storage adds additional cost to the system, occupies additional space and consumes additional power which is of concern, particularly in mobile systems or devices.

DESCRIPTION OF THE PREFERRED EMBODIMENTS

The following detailed description of preferred embodiments refers to the accompanying drawings which illustrate specific embodiments of the invention. Other embodiments having different structures and operations do not depart from the scope of the present invention. Such embodiments of the inventive subject matter may be referred to, individually and/or collectively, herein by the term "invention" merely for convenience and without intending to voluntarily limit the scope of this application to any single invention or inventive concept if more than one is in fact disclosed.

Figure 1:
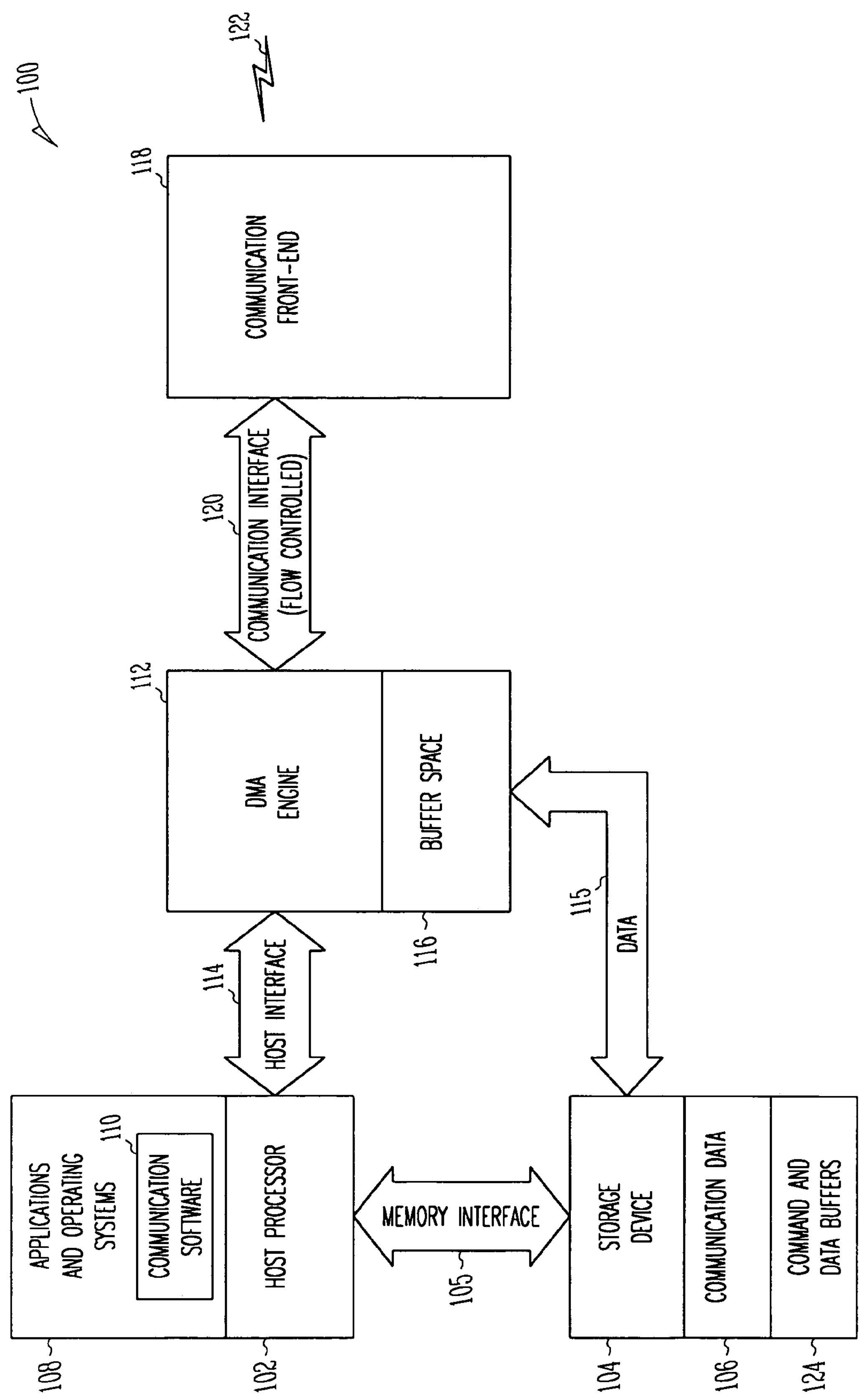
FIG. 1 is a block diagram of a system including real-time data transmission and reception features in accordance with an embodiment of the present invention

FIG. 1 is a block diagram of a system 100 including real-time data transmission and reception features in accordance with an embodiment of the present invention. The system 100 includes a host processor 102 and a data storage or memory device 104 associated with the host processor 102. The storage device 104 may be coupled to the processor 102 by a memory interface 105. The memory interface 105 may be a bus system or the like. The storage device 104 stores code and data used by the processor 102. The storage device 104 may also store communication data 106 that may be transmitted and received by the system 100. The processor 102 runs a non-real time operating system and applications software 108, such as the Microsoft Windows® family of programs or the like, and the processor 102 may also run communication software 110 to perform functions associated with transmitting and receiving data.

A direct memory access (DMA) engine 112 may be coupled to the host processor 102 by a host interface 114. The host interface 114 may be a bus system or similar arrangement. The DMA engine 112 may also be coupled to the storage device 104 by a data interface 115 for the transfer of data to and from the DMA engine 112. The DMA engine 112 may include an associated buffer space 116 into which data may be buffered to compensate for any access latency associated with the storage device 104. The DMA engine 112 may be implemented in hardware or software or a combination of hardware and software. The DMA engine 112 may be coupled to a communication front-end 118, such as a radio frequency (RF) transmitter/receiver or the like, by a communication interface 120 that may be a bus system or the like. The DMA engine 112 and the communication front-end 118 exchange data and control signals over the communication interface 120. The communication front-end 118 transmits and receives data over a communication medium 122, such as free space or a wire or cable connection or the like.

The DMA engine 112 facilitates movement of data between the communication front-end 118 and the storage device 104 in a time-bounded manner without intervention of the host processor 102 and the associated operating system and applications software 108 so that the host processor 102 can continue to carry out other functions. An embodiment of the present invention therefore substitutes a DMA engine 112 or a similar arrangement for a more costly communication co-processor to perform the functions associated with real-time transmission and reception of data and removes any real-time requirements on the communication software 110 running on the host processor 102.

Figure 2:
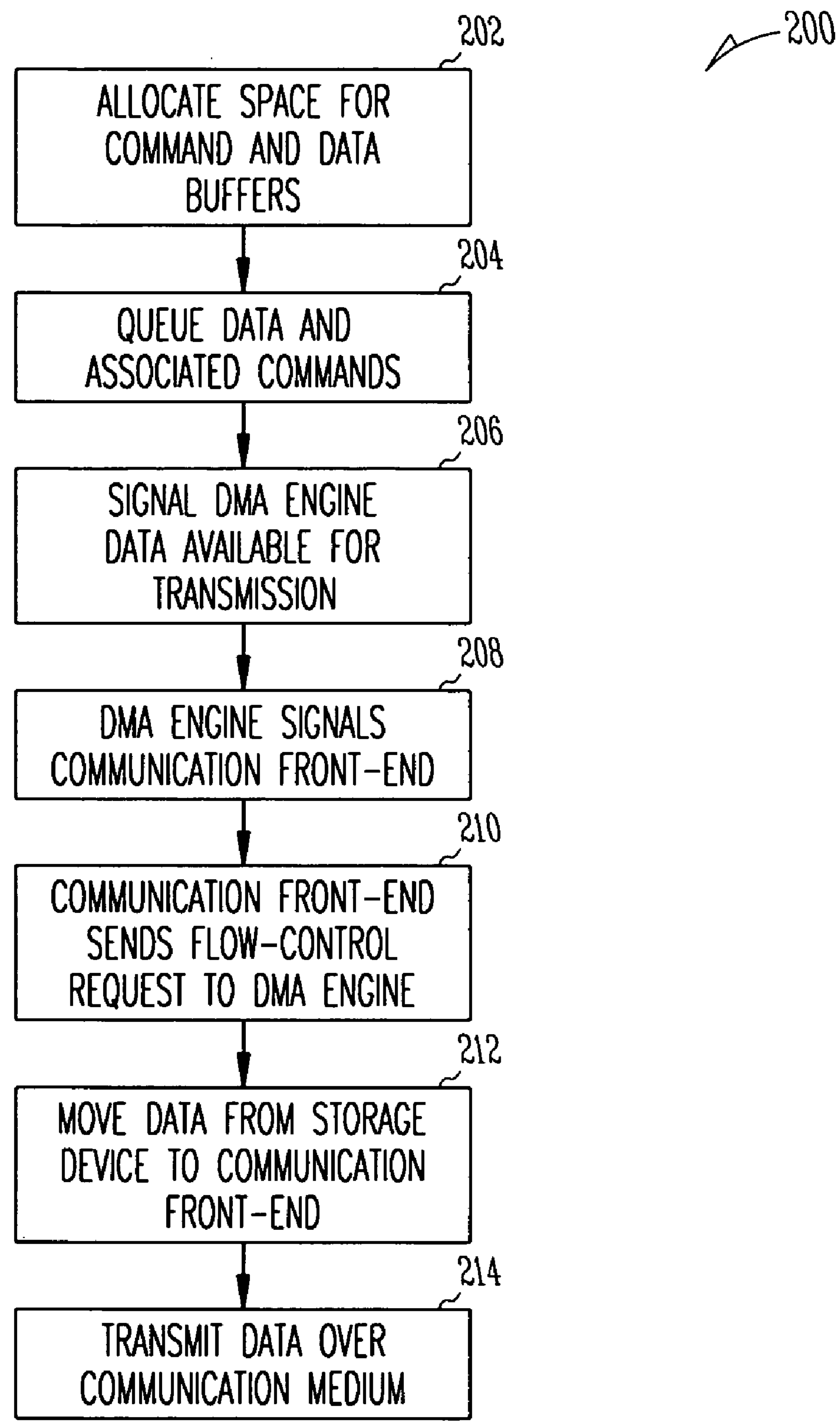
FIG. 2 is a flow chart of a method for real-time data transmission in accordance with an embodiment of the present invention.

FIG. 2 is a flow chart of a method 200 for real-time data transmission in accordance with an embodiment of the present invention. In block 202, the communication software 110 running on the host processor 102 allocates storage space for command and data buffers 124 (FIG. 1) in the storage device 104 to facilitate the transmission and reception of data. In block 204, the communication software 110 queues the data and associated commands in the command and data buffers 124 for transmitting the data. The communication software 110 signals the DMA engine 112 in block 206 that data is available for transmission, and the DMA engine 112 signals the communication front-end 118 that data is available for transmission in block 208. In block 210, a data flow control request signal is sent from the communication front-end 118 to the DMA engine 112 via the communication interface 120. In block 212, the data is moved by the DMA engine 112 from the storage device 104 to the communication front-end 118 and the data is transmitted in block 214 within a time-bounded duration or within a predetermined time frame and without software intervention or interfering with the normal operations of the processor 102.

Figure 3:
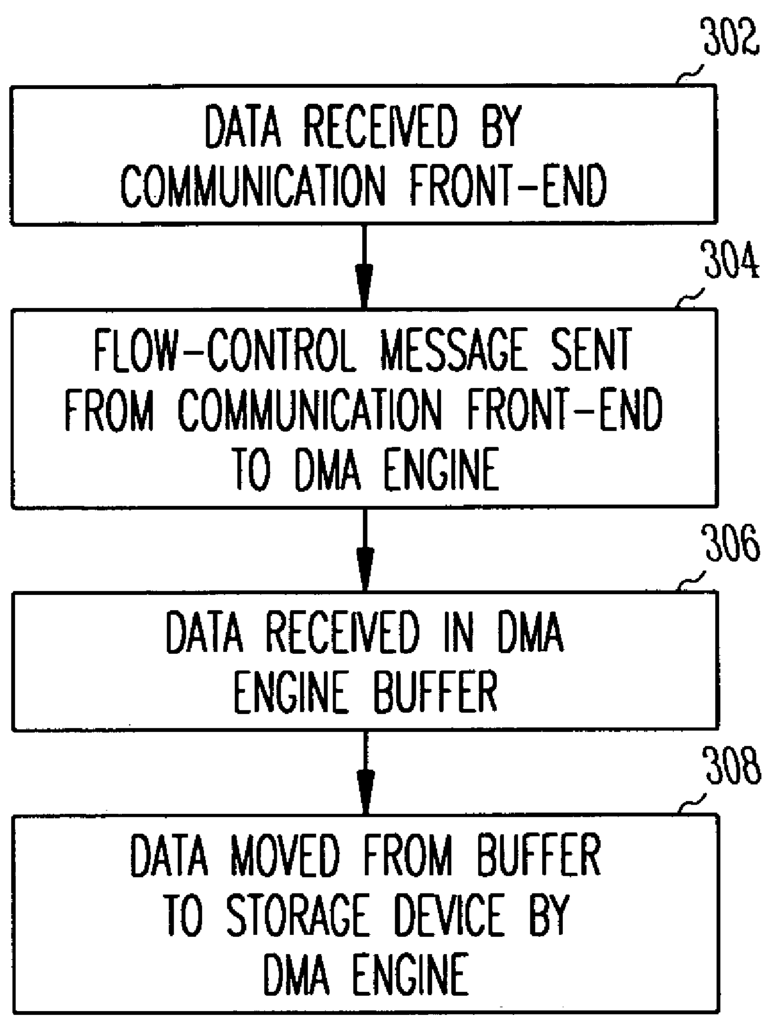
FIG. 3 is a flow chart of a method for real-time data reception in accordance with an embodiment of the present invention.

FIG. 3 is a flow chart of a method 300 for real-time data reception in accordance with an embodiment of the present invention. In block 302, data is received by the communication front-end 118 over the communication medium 122. A data flow control message is sent from the communication front-end 118 to the DMA engine 112 via the communication interface 120 in block 304. The data is received in the DMA engine buffer 116 in block 306. In block 308, the DMA engine 112 moves the data to the storage device 104 within a time-bounded duration without interfering with the normal operations of the processor 102. Accordingly, an embodiment of the present invention effectively removes any real-time requirements on the communication software 110 running on the host processor 102.

The DMA engine 112 includes a flow control protocol to transfer the data between the storage device 104 and the communication front-end 118 isochronously. The DMA engine 112, therefore, provides the functionality of a communication co-processor and eliminates the need for a communication co-processor.

Figure 4:
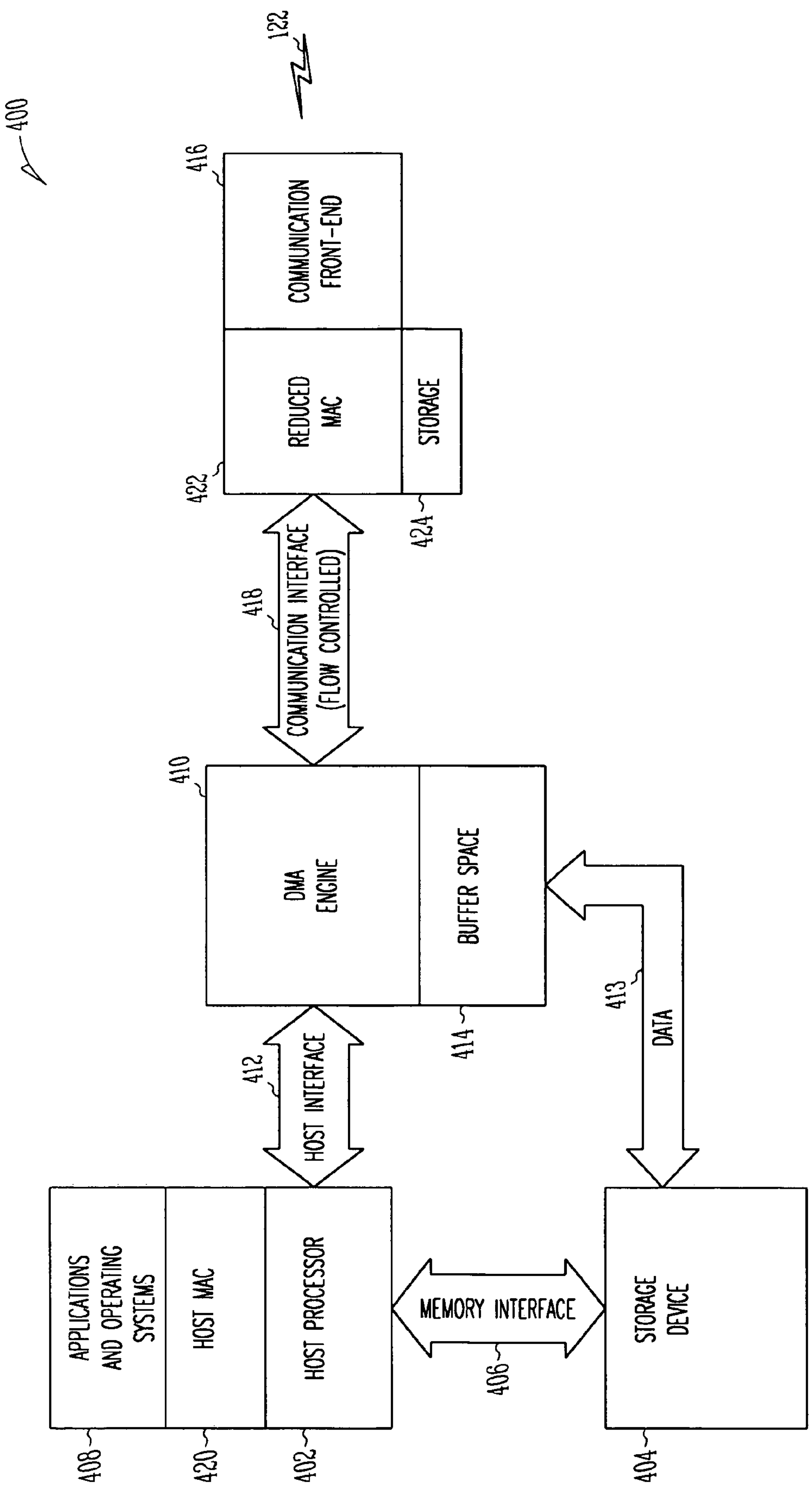
FIG. 4 is a block diagram of a system including real-time data transmission and reception features in accordance with another embodiment of the present invention.

FIG. 4 is a system 400 including real-time data transmission and reception features in accordance with another embodiment of the present invention. The system 400 includes a host processor 402. A storage device 404 may be coupled to the host processor 402 by a memory interface 406. The memory interface 406 may include a bus system or a similar arrangement. The host processor 402 runs non-real time applications and operating system software 408, such as the Microsoft Windows® family of programs or similar programs. A DMA engine 410 may be coupled to the host processor 402 by a host interface 412. The host interface 412 may include a bus system or the like. The DMA engine 410 may also be connected to the storage device 404 by a data interface 413 to transfer data between the DMA engine 410 and the storage device 404. A buffer space 414 may be associated with the DMA engine 410 to compensate for latency in the storage device 404. The DMA engine 410 may be coupled to a communication front-end 416 by a communication interface 418 that may include a bus system or the like.

The system 400 may include a real-time Medium Access Control (MAC) that may be partitioned or divided into a host MAC 420 that may be associated with the host processor 402 and a reduced MAC 422 that may be associated with the communication front-end 416. In general, a Medium Access Control controls access to a shared communication medium by a plurality of devices capable of being attached to the medium. Medium Access Control is the Institute of Electrical and Electronic Engineers (IEEE) sublayer in a local area network (LAN) that controls access to the shared communication medium by the LAN-attached devices. In the context of the Open System Interconnection (OSI) Reference Model, the Medium Access Control layer extends above the Data Link Layer (Layer 2) and below the Physical Link Layer (Layer 1). A MAC can perform functions related to control traffic responses, data movement, management traffic responses and data fragmentation and reassembly.

The MAC functions may be selectively partitioned or divided between the host MAC 420 and the reduced MAC 422 according to response times that may be required to carry out the different MAC functions. The host MAC 420 may be responsible for managing millisecond level functions or functions that can be performed on the order of milliseconds, such as management traffic responses, data fragmentation and reassembly functions and the like. The reduced MAC 422 may be responsible for managing all microsecond level functions or functions that need to be performed on the order of microseconds, such as traffic control responses and the like. The management traffic responses and data fragmentation and reassembly functions performed by the host MAC 420 that do not require microsecond response times may be handled by a sufficiently fast processor 402 running an efficient, non-real-time operating system 408, such as a later version of the Microsoft Windows® family of operating systems or the like. The host MAC 420 may be implemented in software. The reduced MAC 422 may be implemented as logic or as a microcontroller with an associated storage device 424. The DMA engine 410 may be used for data movement in conjunction with the host MAC 420 and the reduced MAC 422 to meet the real-time requirements for data movement in the system 400.

Although specific embodiments have been illustrated and described herein, those of ordinary skill in the art appreciate that any arrangement which is calculated to achieve the same purpose may be substituted for the specific embodiment shown. This application is intended to cover any adaptations or variations of the present invention. Therefore, the embodiments of this invention are limited only by the claims and the equivalents thereof.

What is claimed is:

1. A system, comprising:

a communication front-end to transmit and receive data;

a storage device to store the data;

a host processor;

a memory interface that couples the host processor to the storage device;

a direct memory access (DMA) engine;

a host interface that couples the DMA engine to the host processor; and the DMA engine adapted to move the data to and from the communication front-end in response to flow-control signals, the DMA engine having a flow control protocol to transfer the data between the storage device and the front-end isochronously, eliminating a need for a communication processor.

2. The system of claim 1, further comprising software to queue the data and signal the DMA engine that the data is available to transmit.

3. The system of claim 1, further comprising a buffer space, wherein the DMA engine moves data received by the communication front-end to the buffer space in a predetermined time frame and without software intervention.

4. The system of claim 3, wherein the buffer space is selected to compensate for access latency in the storage device.

5. The system of claim 1, further comprising:

communication software; and command and data buffers allocated by the communication software for transmission and reception of the data.

6. The system of claim 5, further comprising:

the processor running a non-real time operating system; and wherein the DMA engine is adapted to move the data to and from the storage device in a time-bounded manner without interfering with the normal operations of the processor.

7. The system of claim 1, further comprising medium access control (MAC) to control functions associated with transmission and reception of the data.

8. The system of claim 7, wherein the MAC functions are partitioned according to selected functions.

9. The system of claim 8, wherein the MAC functions are partitioned according to response times to perform the selected functions.

10. The system of claim 7, wherein the MAC functions comprise:

traffic control responses;

data movement;

management traffic responses; and data fragmentation and reassembly.

11. The system of claim 7, wherein the MAC functions are partitioned and wherein the partitions comprise:

a host-MAC; and an external reduced-MAC.

12. The system of claim 11, wherein the external reduce-MAC manages traffic control responses.

13. The system of claim 11, wherein the host-MAC manages management traffic responses and data fragmentation and reassembly.

14. A system, comprising:

a communication front-end to transmit and receive data;

a storage device to store the data;

a host processor;

a memory interface that couples the host processor to the storage device;

a direct memory access (DMA) engine;

a host interface that couples the DMA engine to the host processor;

a data interface that couples the DMA engine to the storage device;

a medium access control (MAC) coupled to the host processor and to the communication front-end to control transmission and reception of the data; and the DMA engine moving the data within the system for transmission and reception, the DMA engine having a flow control protocol to transfer the data between the storage device and the front-end isochronously, eliminating a need for a communication processor.

15. The system of claim 14, wherein the MAC is partitioned according to selected functions.

16. The system of claim 14, wherein the MAC is partitioned and comprises:

a host-MAC; and an external reduced-MAC.

17. The system of claim 16, wherein the host-MAC runs on the host processor and manages management traffic responses and data fragmentation and reassembly.

18. The system of claim 16, wherein the external reduced-MAC is associated with the communication front-end and manages traffic control responses.

19. A system, comprising:

a communication front-end to transmit and receive data;

a storage device to store the data;

a host processor;

a memory interface that couples the host processor to the storage device;

a direct memory access (DMA) engine;

a host interface that couples the DMA engine to the host processor;

a data interface that couples the DMA engine to the storage device;

a medium access control (MAC) coupled to the host processor and to the communication front-end to control transmission and reception of the data, the MAC being partitioned into a host MAC associated with the host processor and a reduced MAC associated with the communication front-end; and the DMA engine moving the data within the system for transmission and reception, the DMA engine having a flow control protocol to transfer the data between the storage device and the front-end isochronously, eliminating a need for a communication processor.

20. The system of claim 19, wherein the MAC is partitioned according to selected functions.

21. The system of claim 19, wherein the host-MAC runs on the host processor and manages management traffic responses and data fragmentation and reassembly.

22. The system of claim 19, wherein the reduced MAC manages traffic control responses.

23. A method, comprising:

storing data in a storage device;

signaling a direct memory access (DMA) engine an availability of the data for transmission;

generating a flow-control signal according to a flow control protocol of the DMA engine;

moving data to a communication front-end in response to the flow-control signal, the data being isochronously transferred between the storage device and the communication front-end, eliminating a need for a communication processor;

transmitting the data; and implementing medium access control (MAC) to control transmission and reception of the data, wherein at least a portion of the MAC is implemented in a host processor.

* * * * *